(12) United States Patent
Wallace

(10) Patent No.: US 7,228,199 B2
(45) Date of Patent: Jun. 5, 2007

(54) BULK INVENTORY NETWORK SYSTEM

(75) Inventor: David B. Wallace, Mechanicsburg, PA (US)

(73) Assignee: J.P. Donmoyer, Inc, Ono, PA (US)

( * ) Notice: Subject to any disclaimer, the term of this patent is extended or adjusted under 35 U.S.C. 154(b) by 437 days.

(21) Appl. No.: 10/085,396

(22) Filed: Feb. 28, 2002

(65) Prior Publication Data

US 2002/0082735 A1 Jun. 27, 2002

Related U.S. Application Data

(63) Continuation-in-part of application No. 09/167,379, filed on Oct. 6, 1998, now Pat. No. 6,366,829.

(51) Int. Cl.
| | |
|---|---|
| *G06Q 20/00* | (2006.01) |
| *G08G 1/123* | (2006.01) |
| *G05B 15/02* | (2006.01) |
| *G05B 19/18* | (2006.01) |
| *G06F 17/00* | (2006.01) |

(52) U.S. Cl. ................... 700/236; 705/16; 705/22; 340/989; 340/990; 700/9

(58) Field of Classification Search .............. 705/22, 705/16; 702/188; 340/989–990; 700/236, 700/9

See application file for complete search history.

(56) References Cited

U.S. PATENT DOCUMENTS

| | | | | |
|---|---|---|---|---|
| 4,015,804 A | 4/1977 | Dobler et al. | .................. | 246/5 |
| 4,092,718 A | 5/1978 | Wendt | ........................ | 364/436 |
| 4,212,069 A | 7/1980 | Baumann | .................... | 364/467 |
| 4,360,875 A | 11/1982 | Behnke | ....................... | 364/436 |
| 4,455,483 A | 6/1984 | Schönhuber | ................ | 235/375 |
| 4,487,065 A * | 12/1984 | Carlin et al. | ............. | 73/290 V |
| 4,563,739 A | 1/1986 | Gerpheide et al. | .......... | 364/403 |
| 4,563,793 A | 1/1986 | Ryan | ............................. | 17/58 |
| 4,615,351 A * | 10/1986 | Schliefer et al. | ............... | 137/2 |
| 4,636,950 A | 1/1987 | Caswell et al. | ............. | 364/403 |
| 4,688,244 A | 8/1987 | Hannon et al. | ............... | 379/58 |
| 4,701,760 A | 10/1987 | Raoux | ........................ | 340/993 |
| 4,713,661 A | 12/1987 | Boone et al. | ............... | 340/994 |

(Continued)

FOREIGN PATENT DOCUMENTS

| | | |
|---|---|---|
| DE | 44 11 478 A1 | 11/1994 |
| DE | 19517882 | 11/1996 |
| WO | WO9004834 | 6/1992 |

OTHER PUBLICATIONS

Merriam Webster's Collegiate Dictionary 10th Edition, definition for "automation"; p. 78.*

*Primary Examiner*—Ronald D Hartman, Jr.
(74) *Attorney, Agent, or Firm*—Duane Morris LLP

(57) ABSTRACT

A system and method for remote monitoring of material storage levels for dry bulk goods, wherein an independent entity, such as a transportation carrier, can continuously monitor raw material supply levels at a remote manufacturing plant, and, based on projected usage rates, place timely orders on behalf of the plant, with preselected vendors, to replenish depleted raw materials. The transportation carrier can then coordinate material shipments from the vendor to the manufacturing site using its own trucks. In this manner, the task of maintaining sufficient on site raw material storage levels is completely removed from the manufacturing plant.

3 Claims, 3 Drawing Sheets

U.S. PATENT DOCUMENTS

| | | | | |
|---|---|---|---|---|
| 4,788,648 | A * | 11/1988 | Ferretti et al. | 702/55 |
| 4,791,571 | A | 12/1988 | Takahashi et al. | 364/436 |
| 4,799,162 | A | 1/1989 | Shinkawa et al. | 364/436 |
| 4,857,925 | A | 8/1989 | Brubaker | 340/994 |
| 4,866,255 | A | 9/1989 | Sing | 235/385 |
| 4,961,533 | A | 10/1990 | Teller et al. | 177/25.19 |
| 4,973,970 | A | 11/1990 | Reeser | 342/357 |
| 5,056,017 | A | 10/1991 | McGarvey | 364/403 |
| 5,126,729 | A * | 6/1992 | McKinney et al. | 340/450 |
| 5,128,861 | A | 7/1992 | Kagami et al. | 364/403 |
| 5,154,314 | A | 10/1992 | Van Wormer | 222/1 |
| 5,270,921 | A | 12/1993 | Hornick | 364/407 |
| 5,272,638 | A | 12/1993 | Martin et al. | 364/444 |
| 5,289,183 | A | 2/1994 | Hassett et al. | 340/905 |
| 5,319,544 | A | 6/1994 | Schmerer et al. | 364/403 |
| 5,334,822 | A | 8/1994 | Sanford | 235/385 |
| 5,347,274 | A | 9/1994 | Hassett | 340/988 |
| 5,406,297 | A | 4/1995 | Caswell et al. | 343/741 |
| 5,533,079 | A | 7/1996 | Colburn et al. | 377/6 |
| 5,533,648 | A | 7/1996 | Read | |
| 5,619,560 | A * | 4/1997 | Shea | 379/106.04 |
| 5,644,725 | A | 7/1997 | Schmerer | 395/228 |
| 5,671,362 | A | 9/1997 | Cowe | 395/228 |
| 5,712,789 | A | 1/1998 | Radican | 364/478.14 |
| 5,712,989 | A | 1/1998 | Johnson | 395/228 |
| 5,727,164 | A | 3/1998 | Kaye et al. | 395/228 |
| 5,761,362 | A | 6/1998 | Yang et al. | 385/109 |
| H001743 | H * | 8/1998 | Graves et al. | 700/236 |
| 5,887,176 | A | 3/1999 | Griffith et al. | 395/750 |
| 5,929,770 | A | 7/1999 | Faita | 340/825.35 |
| 5,983,198 | A * | 11/1999 | Mowery et al. | 705/22 |
| 6,148,291 | A | 11/2000 | Radican | 705/28 |
| 6,181,981 | B1 | 1/2001 | Varga et al. | 700/236 |
| 6,336,362 | B1 * | 1/2002 | Duenas | 73/313 |
| 6,345,214 | B1 * | 2/2002 | Dulphy-Vigor et al. | 700/281 |
| 6,366,829 | B1 | 4/2002 | Wallace | 700/236 |

* cited by examiner

BULK INVENTORY NETWORK SYSTEM

This is a continuation-in-part of U.S. patent application Ser. No. 09/167,379, titled BULK INVENTORY NETWORK SYSTEM, filed Oct. 6, 1998, and now issued as U.S. Pat. No. 6,366,829.

FIELD OF THE INVENTION

The invention relates to the field of automated inventory management, and in particular concerns a system for remote monitoring of material storage levels for dry bulk goods, wherein an independent entity, such as a transportation carrier, can continuously monitor raw material supply levels at a remote manufacturing plant, and, based on projected usage rates, place timely orders on behalf of the plant, with preselected vendors, to replenish depleted raw materials. The transportation carrier can then coordinate material shipments from the vendor to the manufacturing site using its own trucks. In this manner, the task of maintaining sufficient on site raw material storage levels is completely removed from the manufacturing plant.

BACKGROUND OF THE INVENTION

Manufacturers frequently employ independent transportation carriers to deliver raw materials from vendor cites to manufacturing sites on an as-needed basis. Traditionally, manufacturers themselves monitor on-site inventory levels and product usage rates, and, when material supplies become low, a phone call is placed from the plant site to an outside vendor to order another shipment of raw materials. Typically, a transportation carrier is separately contracted with to pick up the raw material order from the vendor site and deliver the shipment to the manufacturer.

Raw material inventories must be continuously monitored and raw material orders and shipments must be carefully coordinated to ensure a sufficient amount of materials are always at hand. If material supplies are exhausted before new material shipments can be delivered, manufacturers may be forced to temporarily shut down manufacturing operations, resulting in lost production time and revenues.

When several raw materials are simultaneously used in product manufacturing, the task of monitoring material levels becomes increasingly difficult. An to additional challenge is presented when the usage rate for each of these materials fluctuates over time.

In the case of dry bulk goods such as lime, coal and ash, for example, specially adapted trucks and trailers are often required for transporting the materials from a vendor to a plant site. In order to ensure the availability of a transport carrier when a material shipment is needed, it is desirable to schedule shipments as far in advance as possible. Thus, the ability to monitor existing material levels as well as to project future material requirements is critical. Likewise, the ability to quickly convey this information to a transport carrier is essential.

Several automated systems have been designed to facilitate the management of material inventories. For example, U.S. Pat. No. 5,727,164—Kaye et al. discloses an inventory management system wherein a centralized inventory database can be remotely accessed to retrieve information.

U.S. Pat. No. 5,761,362—Cowe et al. discloses an inventory monitoring system wherein electronic shelf units automatically monitor product inventory levels.

U.S. Pat. No. 5,983,198, issued to Mowery, et al., provides a system and method for using a fleet of vehicles to provide material to a plurality of tanks at various customer locations. An inventory indicator associated with each of the tanks provides a quantity signal to the central station indicating the quantity and temperature of each of the tanks. A processor at the central station monitors the quantity signals of each of the tanks to determine past usage rates of the contents of each of the tanks. The processor projects future tank quantities based on the past usage pattern and determines possible routes for each of the vehicles to each of the tanks. The processor optimizes the routes, delivery amounts, and delivery schedule to minimize total delivered cost for the products based on the projected future tank levels and the possible routes to dispatch each of the vehicles. Each of the foregoing systems allow some form of remote access to a centralized database to monitor inventory levels.

While these systems enable material stores to be remotely monitored, they are not useful for monitoring dry bulk goods nor do they provide means to interpret usage trends or project usage rates based on archived data.

What is needed is an automated system capable of continuously monitoring material levels for dry bulk goods as well as projecting future usage rates for materials based on archived data. Preferably, the system would provide for the automated transmittal of data to a remote site at predetermined time intervals.

SUMMARY OF THE INVENTION

In one aspect of the invention a remote material monitoring system is provided which can be used to monitor inventory quantities for raw materials at a remote site and automatically transmit signals corresponding to existing material levels from the remote site to a central computer at predetermined time intervals.

In another aspect of the invention a remote material monitoring system is provided which includes a central computer having software means capable of determining material levels and projecting material usage rates based on signals transmitted from a remote material storage site.

In another aspect of the invention a remote materials monitoring system is provided in which the central computer includes software means for displaying the material levels and projected usage levels in tablature and graphical form.

In yet another aspect of the invention the central computer includes software means for sounding visual and/or audible alarms if the material levels being monitored fall below predetermined levels.

In yet another aspect of the invention a method is provided for continuously monitoring material levels in a storage vessel at a remote site without human intervention.

In another aspect of the invention a method is provided for a transportation carrier to maintain sufficient raw material quantities at a remote manufacturing plant site.

These and other aspects are provided in a system for monitoring a material quantity at a remote manufacturing site. The system comprises a detector for producing a first output signal corresponding to an existing material quantity. A remote telemetry unit receives the first output signal from the detector and produces a corresponding second output signal. A central computer is coupled to the remote telemetry unit for receiving the second output signal which is automatically transmitted to a central computer at predetermined time intervals. The central computer includes software means for determining the quantity of said existing material at the remote site as well as projected usage rates for said existing material based on the transmitted signals.

In a preferred embodiment of the invention the detector comprises an ultrasonic or strain gauge detector and the remote unit and central computer are coupled via modem for transferring the output signals from the remote unit to a central computer.

In another preferred embodiment of the invention, a system for monitoring a material quantity at a remote site is provided including a sensor that produces a first output signal corresponding to a material quantity within a storage vessel such as a dry bulk silo. A data collector receives the first output signal from the sensor and produces a second output signal that is representative of the quantity of material remaining within the storage vessel. A remote telemetry unit receives the second output signal and transmits a signal indicating material quantity to a central computer disposed in data communication with the remote telemetry unit.

In a further embodiment of the invention, a system for monitoring material levels in storage vessels at a remote site is provided including a level detector that produces a first output signal corresponding to a material level in one of the storage vessels. The level detector may be selected from one of ultrasonic and strain gauge level detectors. A first computer receives the first output signal from the level detector and produces at least one second output signal that is representative of the material quantity. A remote telemetry unit is arranged in data communication with the first computer so as to receive the first output signal from the first computer and transmit an output signal to a second computer in communication with the remote telemetry unit. In some cases, the first computer may include means for transmitting an output signal that is representative of the material level directly to the second computer.

In yet a further embodiment of the invention, a system for monitoring a material level in a storage vessel at a remote site is provided including a level detector for producing an output signal corresponding to the material level, where the level detector comprises means for transmitting the output signal to a remote telemetry unit that, in turn, transmits a signal indicating material quantity to a central computer disposed in data communication with the remote telemetry unit. In some instances, the level detector comprises means for transmitting an output signal that is representative of the level or quantity of material in a storage vessel to a central computer disposed in data communication with the level detector for receiving the signal indicating material quantity.

Also provided is a system for a transportation carrier to maintain a sufficient quantity of raw material at a remote site. The system of this embodiment includes a sensor that produces a first output signal corresponding to a quantity of material located within a storage vessel, e.g., a dry bulk material silo. A data collector receives the first output signal from the sensor and produces a second output signal that is representative of the material quantity within the storage vessel. A remote telemetry unit that receives the second output signal and transmits a signal indicating material quantity data. A central computer is disposed in data communication with the remote telemetry unit for receiving the signal indicating material quantity. The central computer includes means for storing the material quantity data and for projecting a usage rate for the material based on the second output signal.

In addition, a method for a transportation carrier to maintain sufficient quantities of raw materials at a remote manufacturing site is provided that includes the generation of a first signal representative of an existing raw material quantity at a fly remote site. Transmitting a second signal corresponding to the first signal from the remote site to at least one of a local computer and a central computer at predetermined time intervals. The existing raw material quantity and a projected material usage rate for the existing raw material quantity based on the transmitted signals are determined. based upon this determination, additional raw materials are ordered from a preselected vendor based on the existing material quantity and the projected material usage rate. A transport vehicle is provided to deliver the additional raw material from the preselected vendor to the manufacturing site by transporting the additional raw material from the preselected vendor to the manufacturing site.

While the described system and method for monitoring and maintaining remote material stores are applicable for any bulk commodities, they are particularly advantageous for use in connection with the storage of dry bulk goods in storage silos or similar structures.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENTS

Figure 1:
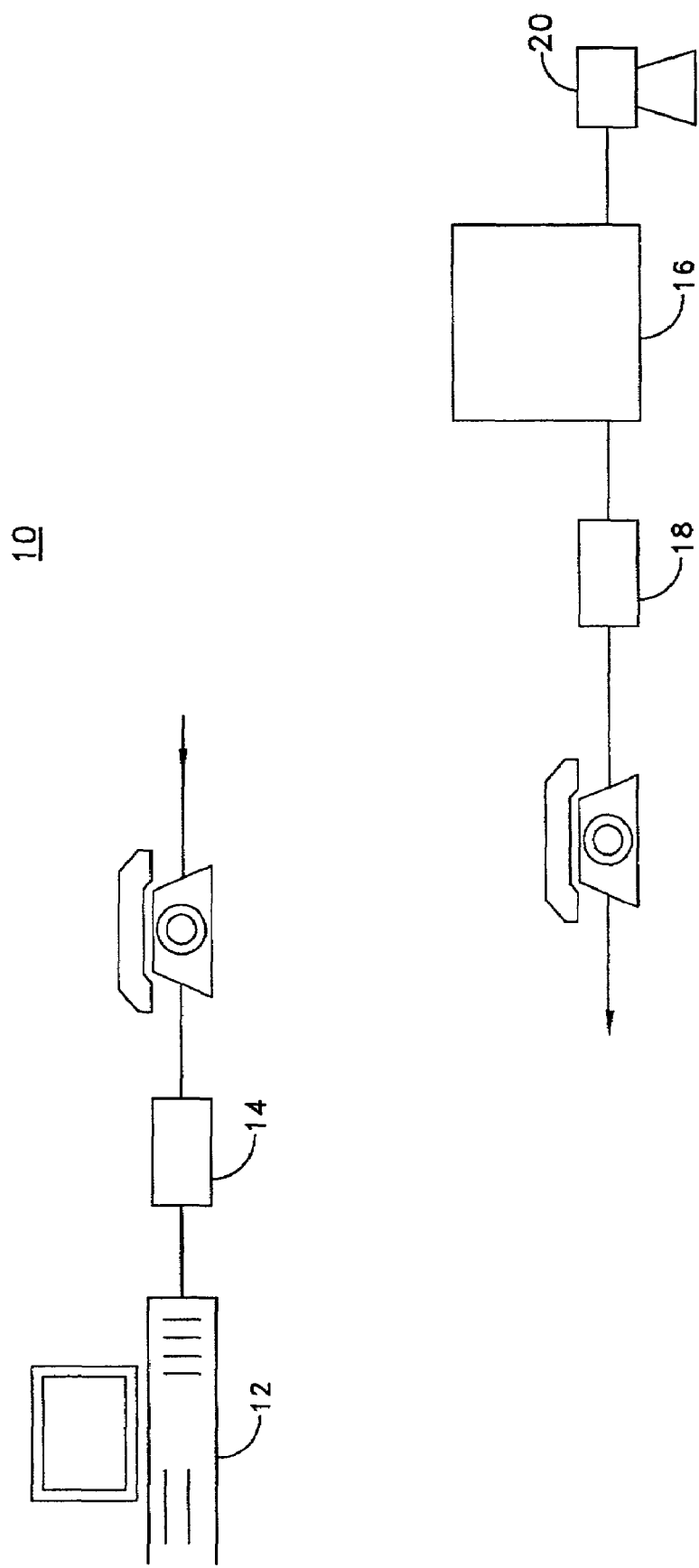
FIG. 1 is a block diagram of a remote inventory monitoring system according to the invention.

This description of preferred embodiments is intended to be read in connection with the accompanying drawings, which are to be considered part of the entire written description of this invention. The drawing figures are presented in somewhat schematic form in the interest of clarity and conciseness. In the claims, means-plus-function clauses are intended to cover the structures described, suggested, or rendered obvious by the written description or drawings for performing the recited function, including not only structural equivalents but also equivalent structures.

The invention concerns a Bulk Inventory Network System (BINS) used to monitor customer inventories and order delivery of dry bulk materials. In one preferred embodiment, the BINS system depends upon transmission of data from remote customer sites to a centrally located computer. Information, transferred by telephone communications, consists of the level or weight of material in storage at the customer's business. When a trigger level or minimum volume of material is reached, dispatchers are notified that a shipment of dry bulk materials should be delivered to the customer's site. Customer storage records are also monitored by the BINS central computer, displayed on a trend graph, and stored as a historical record of dry bulk material usage by the customer.

Referring to FIG. 1, a remote inventory monitoring system 10 according to the invention comprises a central computer 12 and a first modem 14, which are distant from the dry bulk material storage vessel 15 being monitored. One or more remote telemetry units (RTU,) 16, a second modem 18 and a level detector 20 are disposed at the storage vessel site. Typically, level detector 20 is positioned directly on storage vessel 15. Software means are installed and continuously running on central computer 12. The software means receive and store data transmitted from RTUs 16 at each storage vessel 15 in remote inventory monitoring system 10. The software means also determine existing material levels and quantities 22, as well as projected usage rates for each material based on the transmitted data. In addition, the software means are programmed to activate a visual and/or audible alarm (i.e., flashing icon and/or beep) as well as to display the information on a trend graph for easy viewing.

Two alternative means are used to control and operate remote inventory monitoring system 10. A first preferred means is used in connection with a remotely controlled system. The remotely controlled system utilizes a microprocessor based RTU 16 that is programmed to receive a first output signal from level detector 20, produce a second output signal corresponding to said first output signal, place a telephone call to central computer 12 and transfer data to the computer. In this system, each RTU 16 controls data collection and transmission, and therefore, requires relatively sophisticated programming. RTUs 16 are often configured using a laptop computer connected directly to a port in the RTU at the storage site. Under the remote control concept, central computer 12 acts primarily as a data storage and display device. Standard personal computers may be utilized for this portion of the system. Changes to system operations, such as time intervals between data transmissions, usually require a trip to storage vessel 15 site for modification of the RTU programming.

In a second preferred embodiment of the invention, a centrally controlled system is utilized comprising a central computer 12 that contacts each remote site and retrieves data directly from RTU 16 at that site. Site equipment would include a basic RTU 16 configured to receive a first output signal from level detector 20, produce a second output signal corresponding to the first output signal, and on command, transmit the second output signal to central computer 12. System control and programming are concentrated at central computer 20. Typically, central computer 12 is a standard personal computer and RTUs 16 are simplified devices which act primarily as data collection devices and, as a result, require minimal programming.

Preferably, an ultrasonic level detector 24 and/or a strain gauge level detector 26 are used to measure the contents of storage vessel 15. For example, strain gauges 26 can be placed on legs 27 of storage vessel 15 to measure the change in length of legs 27 that is caused by the change in quantity of material in storage vessel 15. These devices typically produce a signal in the range of four to twenty milliamps, which is proportional to the material quantity in the vessel. A preferred ultrasonic level indicator is available from Kistler-Morse under the trade name Sonocell. Remote telemetry unit (RTU) 16 receives the four to twenty milliamp analog signals and converts them into corresponding digital signals which can be processed by central computer 12. RTU 16 then places a telephone call, on preset two-hour timed intervals, to transmit the converted signals to central computer 12.

It would be understood by those skilled in the art that a RTU may be a stand alone unit comprising well known components for analog/digital signal conversion and which may additionally include means for automatic transmission of data to a central computer via modem at predetermined time intervals, or, alternatively, may comprise a plurality of discrete components such as an analog/digital converter, microprocessor and modem also for providing the function. It is also contemplated to use a level detection device having an integrated analog/digital converter and microprocessor which can communicate directly with the central computer.

One RTU that has been found to be particularly useful for use in connection with the present invention is available from Control Microsystems and includes the following components: Model RS-232 Communication Processor; Model 5501-20 8-Channel Analog Input Module; Model 5103 Power Supply Module; and Model ACX24 Transformer. Suitable stand alone RTUs include the Bristol Babcock Models RTU 3301 and RTU 3305, and the Fisher-Rosemount Model ROC 306 Remote Operations Controller.

Central computer 12 receives and stores data transmitted from RTUs 16 at each storage vessel site. Central computer 12 includes commercially available software used to monitor inventory levels and generate statistical data and trend graphs based on the transmitted data. Two suitable software packages are the Lookout Run-Time and Lookout Development software. Other known software packages include Bristol Babcock's ZxMMI graphics software and Intellution's FIX MMI graphics package.

Advantageously, the aforementioned system can be used by a transportation carrier to maintain sufficient quantities of raw materials at a remote manufacturing site. For example, a manufacturer who wishes to relieve itself from the day-to-day responsibility of monitoring, recording and maintaining sufficient raw material stores can contract with a transportation carrier to provide this service.

In accordance with the invention, the transportation carrier maintains a central computer for receiving and processing data from a manufacturing plant. Signals are generated to represent the quantity of material located in from one or more storage vessels 15, e.g., a plurality of dry bulk storage silos or similar containment structures located at a manufacturing plant. The signals are automatically transmitted, via RTU 16, to central computer 12 at predetermined time intervals. Software means generate statistical data in the form of tables and graphs based on the periodic signal inputs. The data include material levels, material usage rates and material usage rate changes, and projected material usage rates. The data is used to plan and schedule shipment of additional material to the plant in order to replenish depleted stores.

A manufacturer may preselect suitable vendors for supplying each raw material. This information is provided to the transportation center at the time of contracting. When raw material levels fall below a predetermined acceptable level, the transportation carrier places an order with the appropriate vendor for additional material. The transportation carrier then coordinates the material shipment from the vendor to the manufacturing site using its own trucks.

Figure 2:
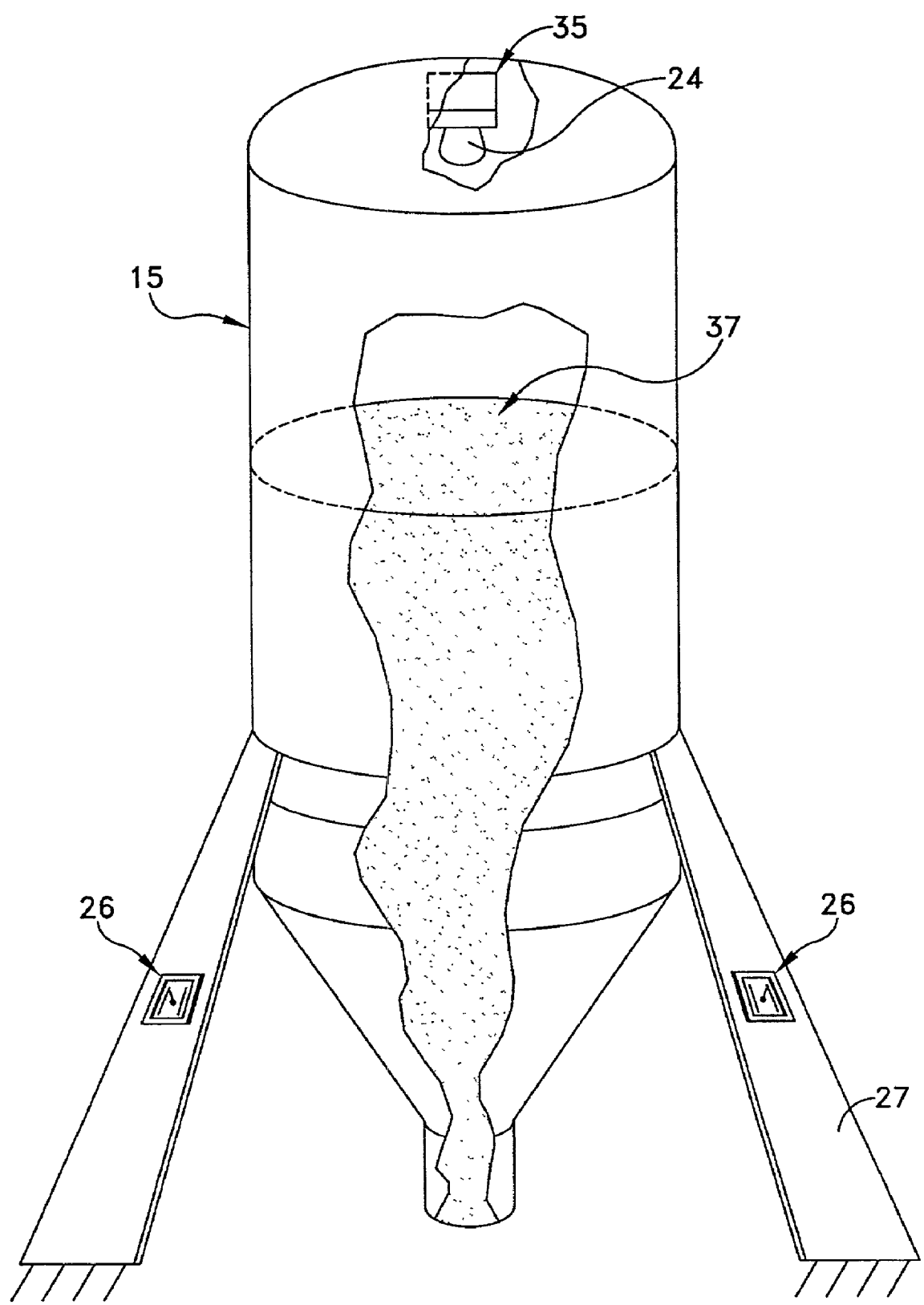
FIG. 2 is a front elevational view of a typical storage vessel, including level detectors, and of the type used in connection with the present invention.

The present invention is susceptible to various modifications. For example, and referring to FIG. 2, a sensing device 35 may be used to detect a quantity of material in a storage vessel 15. Sensing device 35 may determine a material level or a weight of material in storage vessel 15. In some instances, a material level is measured by a mechanical system, i.e., strain gauge level detector 26, or by ultrasonic level detector 24, e.g., a Kistler-Morse Sonocell. Material weight is most often determined using strain gauge level detector 26.

In operation, sensing device 35 determines a quantity of material 37 within storage vessel 15, and transmits a signal, that is representative of that measured material quantity, to a data collection/display unit 38, e.g., a Kistler-Morse Sonologic II system. Data collection/display unit 38 may be located on or adjacent to storage vessel 15, or at least within the general area or facility at which storage vessel 15 is located. Data collection/display unit 38 outputs an analog signal that is proportional to the measured material quantity and transmits that signal to an RTU 16. RTU 16 transmits a signal indicating material quantity to central computer 12 over telephone, radio, or other communication means 40. RTU 16 may be either configured to initiate the data communication or to respond to data requests initiated at central computer 12, or both.

It will be understood that RTU 16 may comprise some combination of power supplies, input/output modules and controllers, and modems of the type known in the art and readily available to those skilled in the electronics and communications arts. Additionally, RTU 16 may be an individual unit, or may be incorporated within a sensing device, data collection/display units, or computers. When central computer 12 receives data from a remote site, Human-Machine-Interface (HMI) software, e.g., the Lookout software program offered by National Instruments, stores and displays the data. Alarms may be generated based on defined settings and limits, and central computer 12 may be either configured to initiate the data communication or to respond to data requests initiated at central computer 12, or both. Information from the HMI software may also be linked to spreadsheets and database software to summarize information in tabular and graphical form. Information from the HMI software also may be automatically uploaded to the Internet for easy access.

Figure 3:
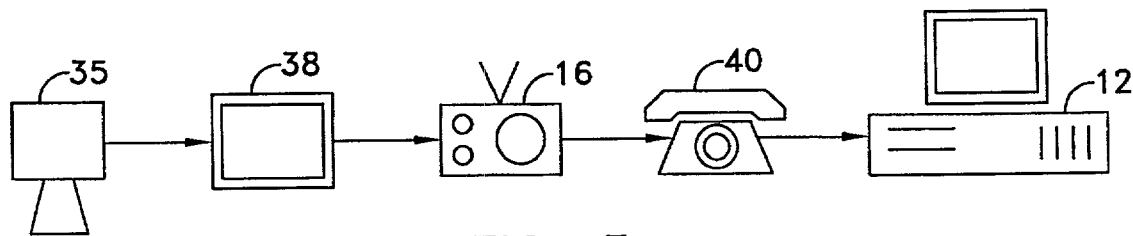
FIGS. 3-8 are partially schematic block diagrams of alternative embodiments of a remote inventory monitoring system according to the invention.

In another example, and referring to FIG. 3, sensing device 35 determines a material quantity within storage vessel 15, and transmits a signal, that is representative of that measured material quantity, to a data collection/display unit 42. Data collection/display unit 42, outputs a signal indicating material quantity and transmits that signal to central computer 12. In this embodiment, functions performed by RTU 16 are physically incorporated within data collection/display unit 42. The signal generated by data collection/display unit 42 can be transmitted over telephone, radio, or other communication means 40. Also, data collection/display unit 42 may be either configured to initiate the data communication or to respond to data requests initiated at central computer 12, or both.

Figure 4:
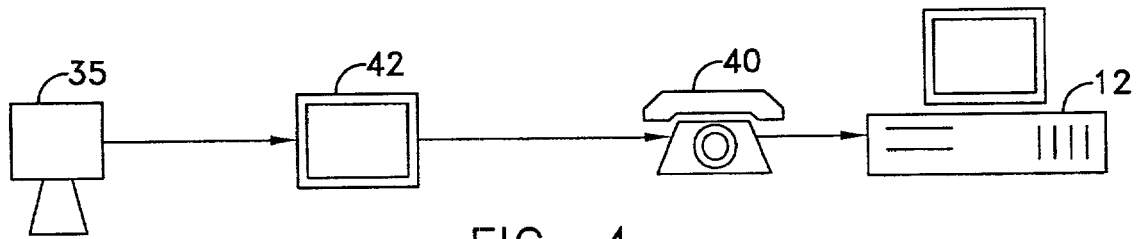

In yet a further example, and refering to FIG. 4, sensing device 35 determines a material quantity within storage vessel 15, and transmits a signal that is representative of that measured material quantity to an on-site computer system 45. On-site computer system 45 outputs an analog signal that is proportional to the measured material quantity and transmits that signal to an RTU 16. RTU 16 transmits a signal indicating material quantity to central computer 12 over telephone, radio, or other communication means 40. In this embodiment, RTU 16 may be configured to either initiate the data communication or to respond to data requests initiated at central computer 12, or both.

Figure 5:
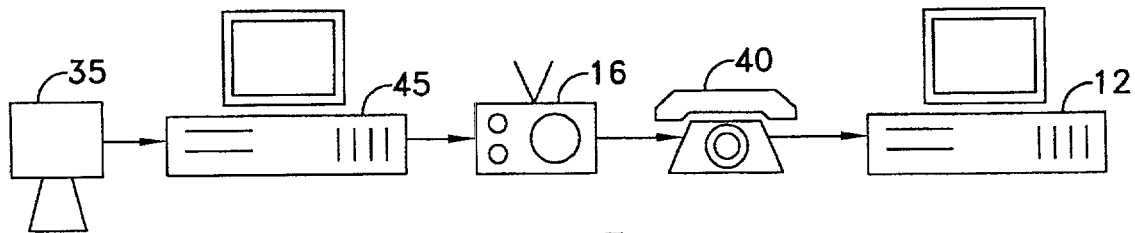

In still another example, and referring to FIG. 5, sensing device 35 determines a material quantity within storage vessel 16, and transmits a signal that is representative of that measured material quantity to an on-site computer system 45. On-site computer system 45 generates a signal proportional to the measured material quantity, and transmits that signal to central computer 12 over telephone, radio, or other communication means 40. On-site computer system 45 may be configured to either initiate the data communication or to respond to data requests initiated at central computer 12, or both.

Figure 6:
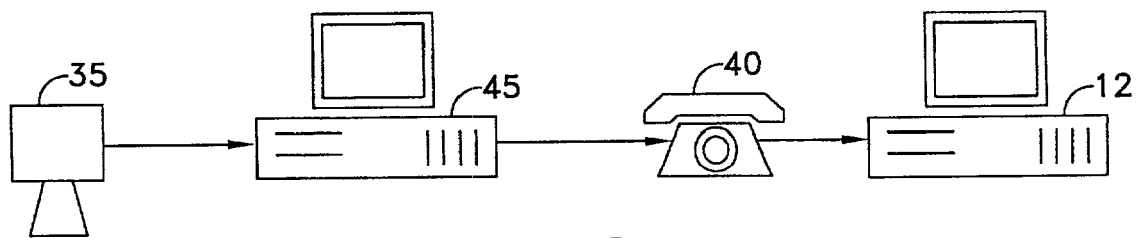

In an additional example, and referring to FIG. 6, sensing device 35 determines a material quantity within storage vessel 15, and transmits a signal that is representative of that measured material quantity, to an RTU 16. RTU 16 transmits that a signal representative of a material quantity to central computer 12 over telephone, radio, or other communication means 40. RTU 16 may be configured to either initiate the data communication or to respond to data requests initiated at central computer 12, or both.

Figure 7:
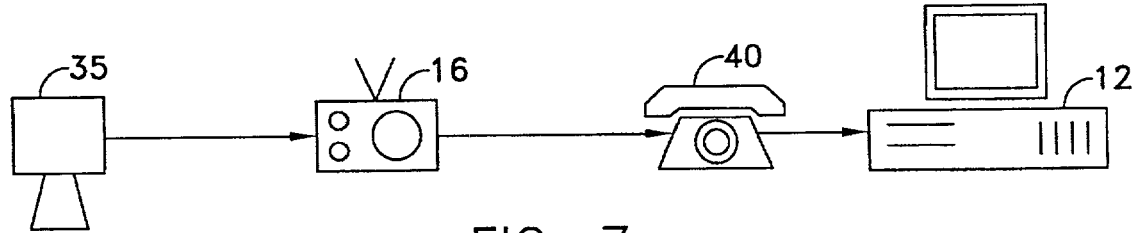
Figure 8:
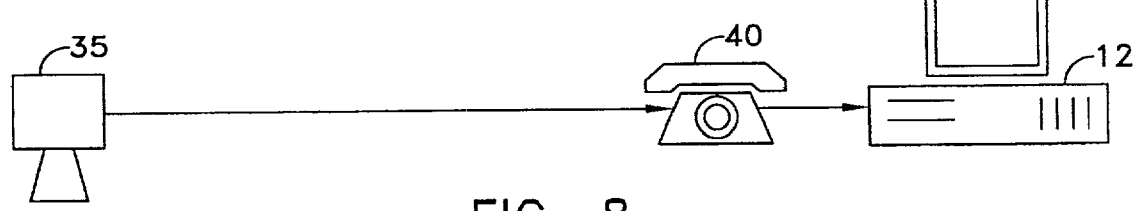

In another example, and referring to FIG. 7, sensing device 35 determines a material quantity within storage vessel 15, and transmits a signal that is representative of that measured material quantity, to central computer 12 over telephone, radio, or other communication means 40. Sensing device may be configured to either initiate the data communication or to respond to data requests initiated at central computer 12, or both.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method for a transportation carrier to maintain sufficient quantities of dry bulk materials at a remote manufacturing site comprising:

generating a first signal representative of an existing dry bulk material quantity at a remote site;

transmitting a second signal corresponding to said first signal, from said remote site to at least one of a local computer and a central computer at predetermined time intervals;

determining said existing dry bulk material quantity and projected material usage rate for said existing dry bulk material quantity based on said transmitted signals;

automatically ordering additional dry bulk materials from a preselected vendor by said at least one of a local computer and a central computer based on said existing material quantity and said projected material usage rate;

automatically directing a transport vehicle to deliver said additional dry bulk material from said preselected vendor to said manufacturing site; and transporting said additional dry bulk material from said preselected vendor to said manufacturing site, whereby additional dry bulk material is supplied to said manufacturing site before said existing dry bulk material is depleted.

2. A method for a transportation carrier to maintain sufficient quantities of dry bulk materials at a remote manufacturing site comprising:

generating a first signal representative of an existing dry bulk material quantity at a remote site;

transmitting a second signal corresponding to said first signal, from said remote site to at least one of a local computer and a central computer at predetermined time intervals;

determining said existing dry bulk material quantity and projected material usage rate for said existing dry bulk material quantity based on said transmitted signals;

automatically ordering additional dry bulk materials from a preselected vendor by said at least one of a local computer and a central computer based on said existing material quantity and said projected material usage rate;

automatically directing a transport vehicle to deliver said additional dry bulk material from said preselected vendor to said manufacturing site; and transporting said additional dry bulk material from said preselected vendor to said manufacturing site,
 whereby additional dry bulk material is supplied to said manufacturing site before said existing dry bulk material is depleted; and producing at least one of an audible and a visual alarm, via said central computer, if said material level falls below a predetermined level.

3. A method for a transportation carrier to maintain sufficient quantities of dry bulk materials at a remote manufacturing site comprising:

generating a first signal representative of an existing dry bulk material quantity at a remote site using one of an ultrasonic and a strain gauge detector to generate said first signal;

transmitting a second signal corresponding to said first signal, from said remote site to at least one of a local computer and a central computer at predetermined time intervals;

determining said existing dry bulk material quantity and projected material usage rate for said existing dry bulk material quantity based on said transmitted signals;

automatically ordering additional dry bulk materials from a preselected vendor by said at least one of a local computer and a central computer based on said existing material quantity and said projected material usage rate;

automatically directing a transport vehicle to deliver said additional dry bulk material from said preselected vendor to said manufacturing site; and transporting said additional dry bulk material from said preselected vendor to said manufacturing site,
 whereby additional dry bulk material is supplied to said manufacturing site before said existing dry bulk material is depleted.

* * * * *